UNITED STATES PATENT OFFICE.

LEWIS E. SAUNDERS, OF NIAGARA FALLS, NEW YORK, ASSIGNOR TO NORTON COMPANY, OF WORCESTER, MASSACHUSETTS, A CORPORATION OF MASSACHUSETTS.

PROCESS OF PURIFYING ALUMINOUS MATERIALS.

960,712.  Specification of Letters Patent.  Patented June 7, 1910.

No Drawing. Application filed September 14, 1909. Serial No. 517,706.

*To all whom it may concern:*

Be it known that I, LEWIS E. SAUNDERS, a citizen of the United States, residing at Niagara Falls, in the county of Niagara and State of New York, have invented certain new and useful Improvements in Processes of Purifying Aluminous Materials, of which the following is a specification.

The object of this invention is the provision of a process of purifying aluminous materials such as bauxite, clay, etc., and producing therefrom a commercially pure alumina, which is well adapted to the various uses to which such material may be applied, as for example as an abrasive or refractory material, as a source of aluminum, etc.

The process is particularly advantageous as applied to aluminous materials which are relatively high in silica, as for example silicious bauxites and clays.

It has been proposed heretofore to purify bauxite by the addition to the calcined material of a certain proportion of carbon, usually about 10 per cent., and the fusion of the mixture in an electric furnace, the carbon being proportioned to the quantity of reducible impurities in the bauxite and combining with a portion of these with formation of an alloy which segregates from the molten mass. In practice however it has not been possible to secure by this method a complete or substantially complete elimination of the impurities, especially titanium. If the amount of carbon used be carefully proportioned to the percentage of reducible impurities, it will be found that the reduction is quite incomplete; and if carbon be used in some excess of this proportion it is found that the reduction is still incomplete, and furthermore that the product is contaminated by the presence of carbid of aluminum and compounds of the associated metals. It appears as a probable explanation of this phenomenon that whereas the metals iron, silicon and titanium, which are commonly associated with aluminum, and the alloys of these metals, are quite insoluble in the molten bath of alumina and incapable of diffusing therethrough, their carbids are more or less readily soluble in or miscible with the bath, the result being that the use of a sufficient proportion of carbon to form carbids or carburized compounds of the associated metals results in their being again taken up by the molten bath, or in their failure to separate therefrom. It is not however to be inferred that the metals are necessarily redissolved or diffused through the bath as carbids, for it is quite probable that the carbon may serve as a carrier of oxygen between the alumina and the reduced impurities, whereby these are returned to the molten bath as oxids or oxidized compounds.

According to the present invention I make use of the strong reducing properties of aluminum carbid to secure a more nearly complete elimination of the metals or impurities associated with the alumina than has heretofore been practicable: and in the embodiment of the invention wherein it is applied to the treatment of clays or of bauxites high in silica, I further make use of the known fact that silicon is capable of preventing the absorption of large proportions of carbon by such metals as iron and titanium. In the preferred embodiment of the invention I add to silicious bauxite or clay a proportion of carbon largely in excess of that required to reduce the iron, silicon and titanium therein, and fuse the mass in a suitable electric furnace, whereby a considerable portion or even all of the alumina is converted into aluminum carbid. This carbid is capable of mixing with molten alumina or of dissolving or diffusing therein, and when so dissolved or diffused, or when in a molten condition, is a most energetic reducing agent, by the action of which, supplementing that of the carbon, the oxids of the associated impurities are reduced with substantial completeness: at the same time the reduced metal or alloy is by its content of silicon prevented from absorbing or combining with such proportion of carbon as would bring about an amount of re-solution or diffusion capable of contaminating the bath to a degree rendering it unfit or objectionable for industrial purposes. Thereafter the aluminum carbid, or the mixture of alumina and aluminum carbid, is separated from the reduced impurities and is oxidized, preferably while yet in a molten condition, with the result that a homogeneous mass of commercially pure alumina is obtained.

In the practice of the invention, I mix calcined silicious bauxite or clay with an amount of carbon very considerably in excess of that theoretically required to reduce the associated oxids of iron, silicon and titanium, and fuse the mass in an electric furnace. The proportion of carbon will vary according to the character of the raw material, but is usually not less than 25 per cent. of its weight, and may be the full proportion necessary to reduce the associated oxids to the metallic state and to convert the alumina into a carbid; usually however a complete conversion of the alumina into carbid is unnecessary and to a certain extent wasteful, but it is essential that enough aluminum carbid should be formed to bring about with the desired completeness the reduction of the oxidized compounds associated with the alumina.

The reduced metals are allowed to settle from the molten bath of aluminum carbid, or alumina and aluminum carbid, and are removed therefrom, preferably by tapping either the reduced metals or the molten bath. The molten bath, substantially free from metals other than aluminum, is then oxidized in any suitable way, as for example by blowing an oxidizing gas, usually air, through the molten mass in the furnace or after tapping, in a trough or other receptacle, by showering the molten mass through the air, by spattering or otherwise subdividing it in air, etc. This reaction is strongly exothermic, and the fluidity of the bath is increased by the heat set free, whereby the operation of blowing and any pouring or tapping operation is rendered easier than would otherwise be the case. Obviously the temperature may be maintained if necessary during either or both of these operations by a supply of heat from other sources. The fully oxidized mass, free or substantially free from aluminum carbid and consisting essentially of previously molten alumina, may be permitted to solidify in place, poured or tapped, or otherwise treated as desired.

I claim:

1. The process of purifying aluminous materials which consists in fusing the same in presence of carbon in excess of that required to reduce the associated impurities, thereby reducing the associated impurities and producing a molten bath containing aluminum carbid, separating the reduced impurities, and then oxidizing the aluminum carbid by means of an oxidizing gas.

2. The process of purifying aluminous materials which consists in fusing the same in presence of carbon in excess of that required to reduce the associated impurities, thereby reducing the associated impurities and producing a molten bath containing aluminum carbid, separating the reduced impurities, and oxidizing the aluminum carbid while in a molten state.

3. The process of purifying aluminous materials which consists in fusing the same in presence of carbon in excess of that required to reduce the associated impurities, thereby reducing the associated impurities and producing a molten bath containing aluminum carbid, separating the reduced impurities, and oxidizing the aluminum carbid by exposing the same in a molten state to the action of an oxidizing gas.

4. The process of purifying aluminous materials which consists in fusing the same in presence of carbon in excess of that required to reduce the associated impurities, thereby reducing the associated impurities and producing a molten bath containing aluminum carbid, separating the reduced impurities, and oxidizing the aluminum carbid by blowing an oxidizing gas through the molten bath.

5. The process of purifying aluminous materials containing silicon and metals capable of alloying therewith which consists in fusing the same in presence of carbon in excess of that required to reduce the associated impurities, thereby reducing the associated impurities and producing an alloy high in silicon and low in carbon and a molten bath containing aluminum carbid, separating the alloy, and then oxidizing the aluminum carbid by means of an oxidizing gas.

6. The process of purifying aluminous materials containing silicon and metals capable of alloying therewith which consists in fusing the same in presence of carbon in excess of that required to reduce the associated impurities, thereby reducing the associated impurities and producing an alloy high in silicon and low in carbon and a molten bath containing aluminum carbid, separating the alloy, and oxidizing the aluminum carbid while in a molten state.

7. The process of purifying aluminous materials containing silicon and metals capable of alloying therewith which consists in fusing the same in presence of carbon in excess of that required to reduce the associated impurities, thereby reducing the associated impurities and producing an alloy high in silicon and low in carbon and a molten bath containing aluminum carbid, separating the alloy, and oxidizing the aluminum carbid by exposing the same in a molten state to the action of an oxidizing gas.

8. The process of purifying aluminous materials containing silicon and metals capable of alloying therewith which consists in fusing the same in presence of carbon in excess of that required to reduce the associated impurities, thereby reducing the associated impurities and producing an alloy high in silicon and low in carbon and a molten bath containing aluminum carbid, separating the alloy, and oxidizing the aluminum carbid by blowing an oxidizing gas through the molten bath.

9. The process of purifying aluminous materials which consists in reducing the impurities by means of aluminum carbid in excess, separating the reduced impurities, and then oxidizing the remaining aluminum carbid by means of an oxidizing gas.

10. The process of purifying aluminous materials which consists in reducing the impurities by means of aluminum carbid in excess, separating the reduced impurities, and oxidizing the remaining aluminum carbid by exposing the same in a molten state to the action of an oxidizing gas.

In testimony whereof, I affix my signature in presence of two witnesses.

LEWIS E. SAUNDERS.

Witnesses:
SAMUEL F. HALL,
NEIL A. WILSON.